US010222869B2

(12) United States Patent
Moran

(10) Patent No.: US 10,222,869 B2
(45) Date of Patent: Mar. 5, 2019

(54) STATE MACHINE BASED TRACKING SYSTEM FOR SCREEN POINTING CONTROL

(71) Applicant: Intel Corporation, Santa Clara, CA (US)

(72) Inventor: Amit Moran, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 179 days.

(21) Appl. No.: 14/816,953

(22) Filed: Aug. 3, 2015

(65) Prior Publication Data
US 2017/0038857 A1    Feb. 9, 2017

(51) Int. Cl.
G06F 3/01    (2006.01)
G06F 3/0482    (2013.01)

(52) U.S. Cl.
CPC ............ G06F 3/017 (2013.01); G06F 3/0482 (2013.01)

(58) Field of Classification Search
CPC .......... G06F 3/011; G06F 3/014; G06F 3/017; G06F 3/03; G06F 3/033; G06F 3/03542; G06F 3/03545; G06F 3/038–3/0386; G06F 3/048–3/0483; G06F 2203/0384
See application file for complete search history.

(56) References Cited

U.S. PATENT DOCUMENTS

2006/0033712 A1* 2/2006 Baudisch ................ G06F 3/038
345/157
2010/0281438 A1* 11/2010 Latta ...................... G06F 3/017
715/863
2012/0157208 A1* 6/2012 Reville ................... G06F 3/017
463/39
2013/0336524 A1* 12/2013 Zhang .................... G06F 3/017
382/103
2014/0225826 A1* 8/2014 Juni ....................... G06F 3/017
345/156
2014/0232649 A1* 8/2014 Youssef ................. G06F 3/0346
345/157
2015/0054820 A1* 2/2015 Ji ........................... G06F 3/017
345/418
2015/0062010 A1* 3/2015 Lin ........................ G06F 3/017
345/157
2015/0220153 A1* 8/2015 Aliseychik ............. G06F 3/017
345/157
2015/0378440 A1* 12/2015 Umlauf .................. G06F 3/017
345/156

* cited by examiner

Primary Examiner — Nathan Danielsen
(74) Attorney, Agent, or Firm — Grossman, Tucker, Perreault & Pfleger, PLLC

(57) ABSTRACT

Generally, this disclosure provides systems, devices, methods and computer readable media for state machine based pointing control. A method may include receiving a position estimate of a first location associated with a first portion of a pointing device and a position estimate of a second location associated with a second portion of the pointing device; calculating a vector from the estimated position of the first location to the estimated position of the second location; and resolving the vector into a first distance component (Dx) and a second distance component (Dy), the Dy component orthogonal to the Dx component. The method may further include tracking temporal changes of the Dx and Dy components; updating an interaction state based on a rate of change of the Dx and Dy components; and moving a cursor position on a display element screen based on the temporal change and the interaction state.

19 Claims, 8 Drawing Sheets

US 10,222,869 B2

STATE MACHINE BASED TRACKING SYSTEM FOR SCREEN POINTING CONTROL

FIELD

The present disclosure relates to tracking systems for pointing control, and more particularly, to state machine based finger tracking systems for screen pointing control.

BACKGROUND

As three dimensional (3-D) cameras and visual tracking systems become less expensive and more commonly available, there is an increasing effort to employ this technology to improve user interaction with computer systems. For example, hand gestures may be detected to perform specific actions such as volume control or muting. Attempts to provide pointing control, however, (similar, for example, to that provided by mouse operation) present additional challenges using this technology.

One problem is that the resolution of the tracking camera is typically much less than the resolution of the screen. It is not generally possible therefore to map, say, a user's fingertip from the tracking image, to every pixel on the screen. This limits the pointing accuracy of such a system, making it difficult, for example, to select a small icon on the screen or perform other relatively fine motion operations. Another problem is related to ergonomics. It can become tiring and uncomfortable for a user to move his or her hand and arm throughout the entire image field of the camera in order to exercise pointing control over the computer system, especially over longer periods of time, thus making this approach impractical.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for state machine based pointing control, for example of the position of a cursor on the screen of a computer or other device.

In some embodiments, a three dimensional (3-D) tracking system provides a pair of locations corresponding to, for example, the palm and the fingertip of a user's hand (or different parts of a pen or other such pointing item). A distance vector between the pair of locations is calculated and resolved into two components, for example along orthogonal dimensions. In some embodiments, the distance vector may be normalized based on a calibration process. The distance vector and the rate of change of the distance vector may be tracked over time, as will be described in greater detail below, and the rate of change may be used to update a state machine that maintains a current user interaction state. These interaction states may be associated with varied level of pointing control ranging from relatively coarse pointing control, to relatively finer pointing control, as well as to freezing of the pointer location.

Spatial updates to the pointer, for example changes in screen coordinates, may be calculated based, at least in part, on the temporal changes in the distance vector and on the current interaction state. Thus, a relatively small area of physical interaction (the hand/finger manipulation area) may be mapped to a relatively large area of virtual interaction (the screen) through use of different pointing control interaction states. This allows for relatively small movements of the hand or finger to provide access to the entire interaction area of the screen, while the user's arm may remain comfortably at rest, for example on a desktop or other work surface.

Figure 1:
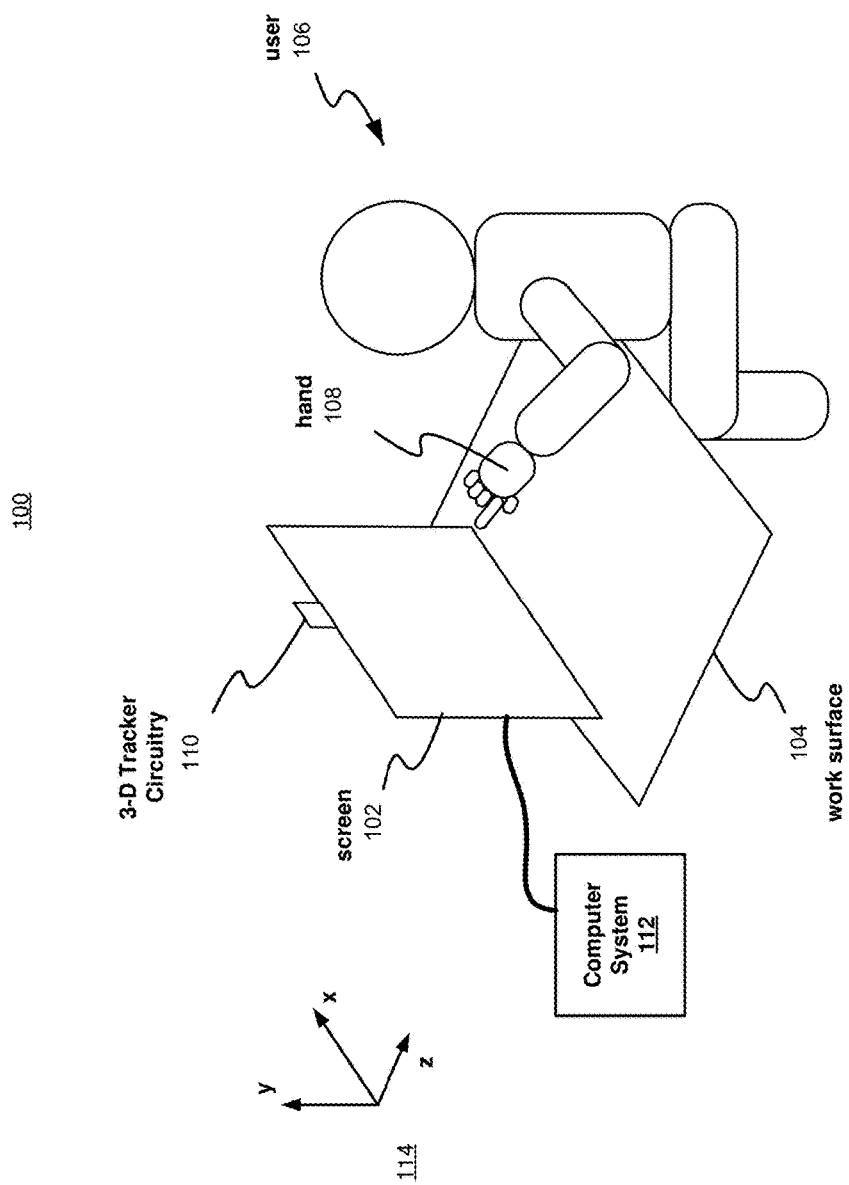
FIG. 1 illustrates a user of a system consistent with an example embodiment the present disclosure.

FIG. 1 illustrates a scenario 100 of a user of a system consistent with an example embodiment the present disclosure. A user 106 is shown to be interacting with a computer system 112 that includes a display element with screen 102. The user 106 may be seated at a desk or other suitable work surface 104. Three-dimensional tracker circuitry 110 may be configured to track the movements of the user's hand 108, for example from wrist to fingertip. The tracking may be provided in the form of coordinates (x,y,z) in a 3-D space defined by x-, y-, and z-axes as shown 114. Embodiments of the present disclosure may enable the user to control pointing (e.g., the position of the cursor) on the screen 102 through relatively small hand movements while providing relatively high pointing accuracy, as will be explained in greater detail below. Such operation may improve ergonomics by allowing the user's elbow to remain comfortably resting on the work surface 104. The screen 102 may be considered to lie in the x,y plane, for convenience, in the descriptions of embodiments to follow.

Figures 2A, 2B:
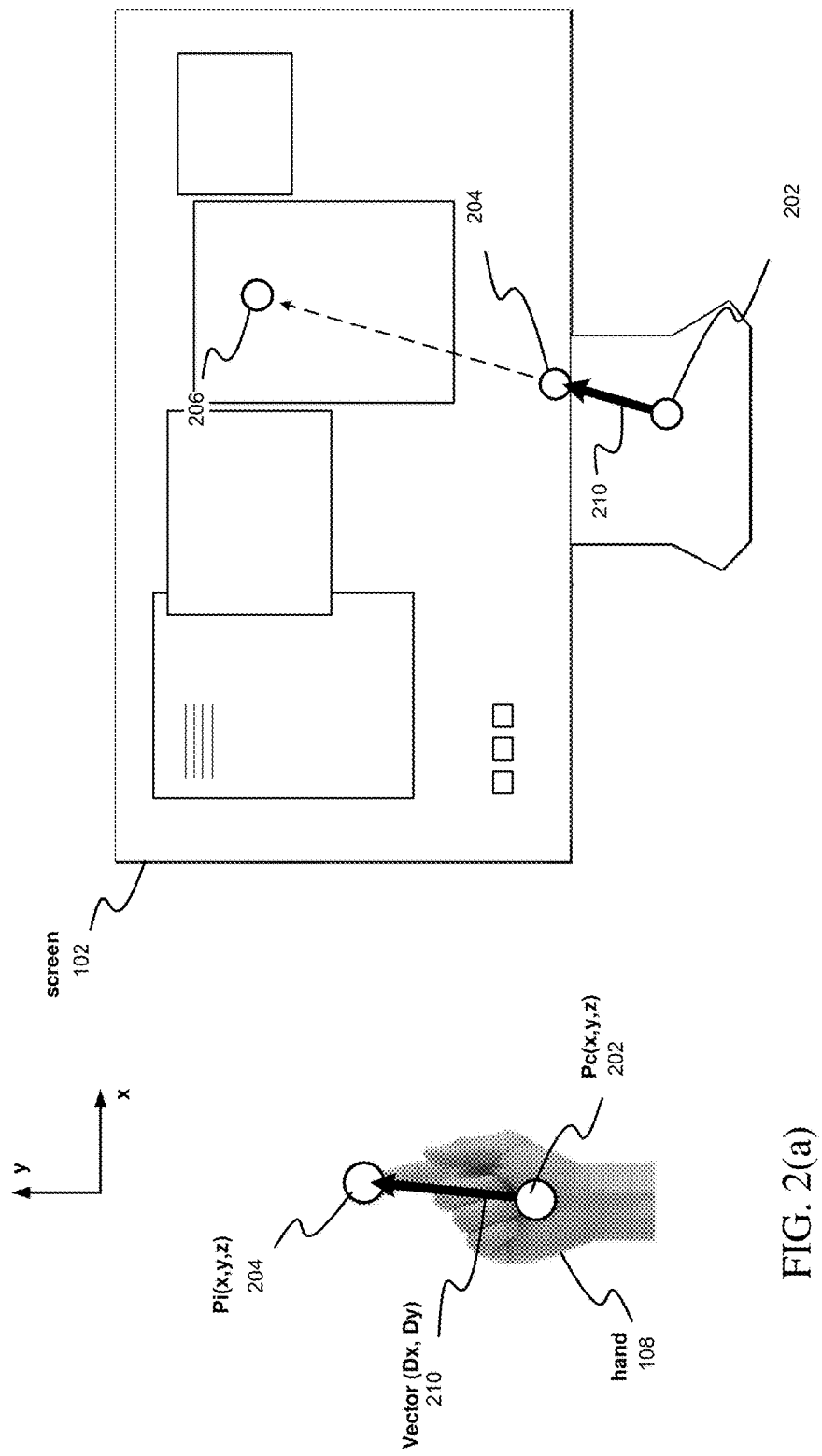
FIGS. 2(a) and 2(b) illustrate finger tracking for screen pointer control consistent with an example embodiment the present disclosure.

FIGS. 2(a) and 2(b) illustrate finger tracking for screen pointer control consistent with an example embodiment the present disclosure. In FIG. 2(a), the user's hand 108 is shown as the pointing device for screen pointer control. The 3-D tracker circuitry 110 may be configured to track and locate the center of mass of the user's palm (Pc) 202 and the tip of the user's index finger (Pi) 204, providing three-dimensional coordinates (x,y,z) for each. A two-dimensional vector 210, with components Dx and Dy, may be calculated to provide a distance and direction from Pc to Pi. The vector components, Dx and Dy, may be orthogonal to each other and lie in a plane that is substantially parallel to the x,y plane of the screen 102. For example, in some embodiments, Dx and Dy may deviate from the x,y plane by less than 10 degrees.

FIG. 2(b) illustrates an example of the vector 210 being used to locate a position 206 on the screen 102. It will be appreciated that a variety of types of motion of the user's hand, finger and/or wrist may result in changes in Dx and Dy. For example, rotating the hand in the x,y plane while maintaining the finger to its fully extended length will re-distribute the overall length of the vector 210 between the Dx and Dy components. Curling the finger to shrink its length will decrease the length of the vector 210. Rotating the hand forward towards the screen (in the z-axis direction) will also decrease the length of the vector 210, even if the finger is kept at its fully extended length. These changed (and rates of change) in Dx and Dy will guide the pointing process, as will be explained below.

In some embodiments, a pen or other such device may be used as a pointer in place of the user's hand 108, and that the opposite ends of the pen, along its longitudinal axis, may be tracked in an equivalent manner to the user's palm and index finger as described above.

Figure 3:
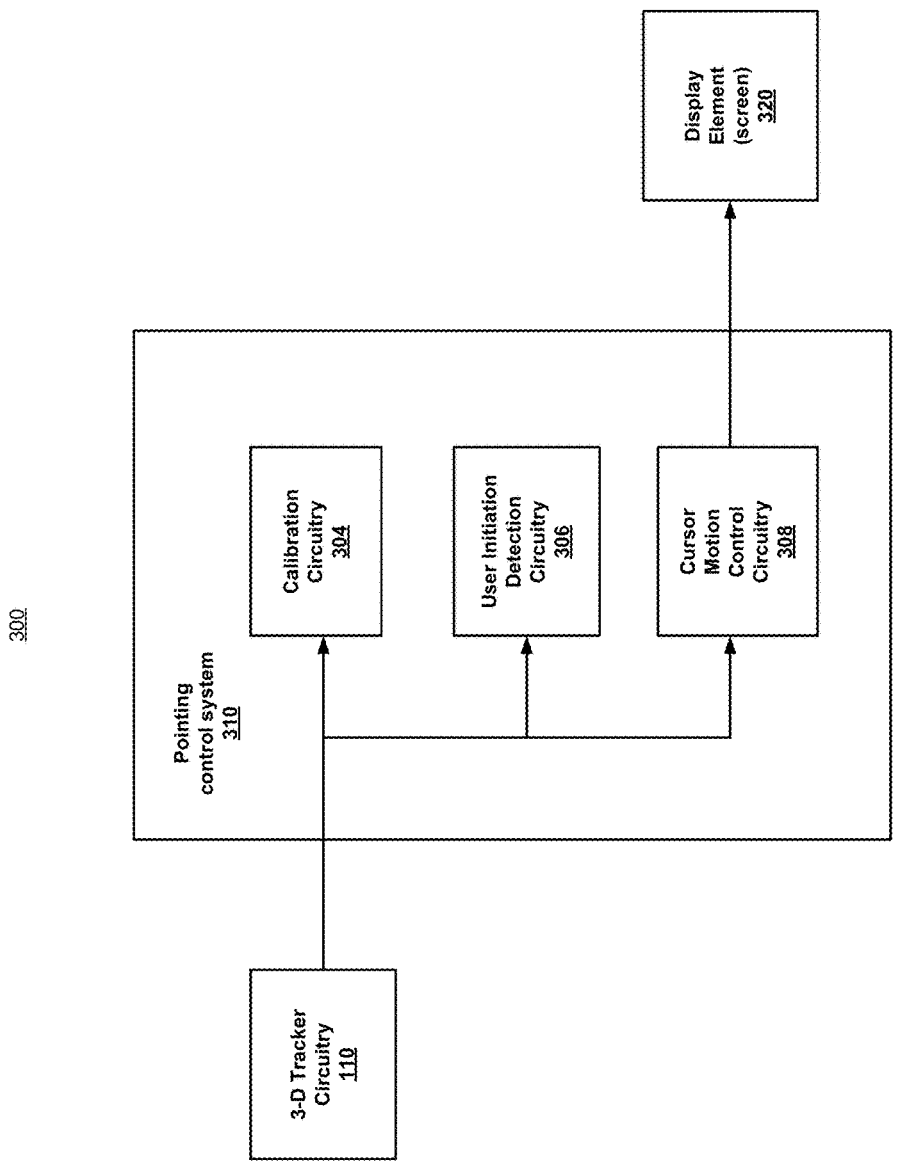
FIG. 3 illustrates a top level system diagram of an example embodiment consistent with the present disclosure.

FIG. 3 illustrates a top level system diagram 300 of an example embodiment consistent with the present disclosure. A pointing control system 310 is shown to include calibration circuitry 304, user initiation detection circuitry 306 and cursor motion control circuitry 308, the operations of which will be described in greater detail below. In some embodiments, the pointing control system 310 may be implemented in the computer system 112.

The pointing control system 310 may be configured to receive inputs from the 3-D tracker circuitry 110, which may include a 3-D camera configured to obtain images of the user, and any other people or objects within a set field of view. The 3-D camera may operate on visible light, infrared, or any other suitable region of the spectrum. Any available and suitable 3-D tracking system or circuitry may be used for this purpose and, in some embodiments, may be implemented as part of computer system 112. The pointing control system 310 may also be configured to provide data and control signals to display element 320 to control the position of a cursor or other pointing indicia or icon on the screen 102 of the display element.

The calibration circuitry 304 may be configured to determine a maximum expected length of the Dx and Dy components which may be used for normalization as later described. In some embodiments, calibration may be performed as a manual operation, one time for each user prior to their first use of the system. The user may be asked to point to different extremities of the screen to allow the calibration system to measure the maximum associated distance from Pc to Pi (or the length of the pen or pointing device). In some embodiments, calibration may be performed in an automatic fashion based on statistics (e.g., an average) collected from a number of manual calibrations performed on each member of a relatively large group of users. In some embodiments, calibration may be dynamically updated based on measurement from the 3-D tracking system, as the user interacts with the system.

The user initiation detection circuitry 306 may be configured to detect that the user is willing to start an interaction. In some embodiments, this may be accomplished by measuring the proximity or distance of the user to the screen and comparing that to a threshold distance value. The pointing control system may then be activated when the user is closer than the threshold distance. In some embodiments, initiation may be triggered by detection of a selected user gesture. For example, the user may point upwards to signal an intention to begin.

Figure 4:
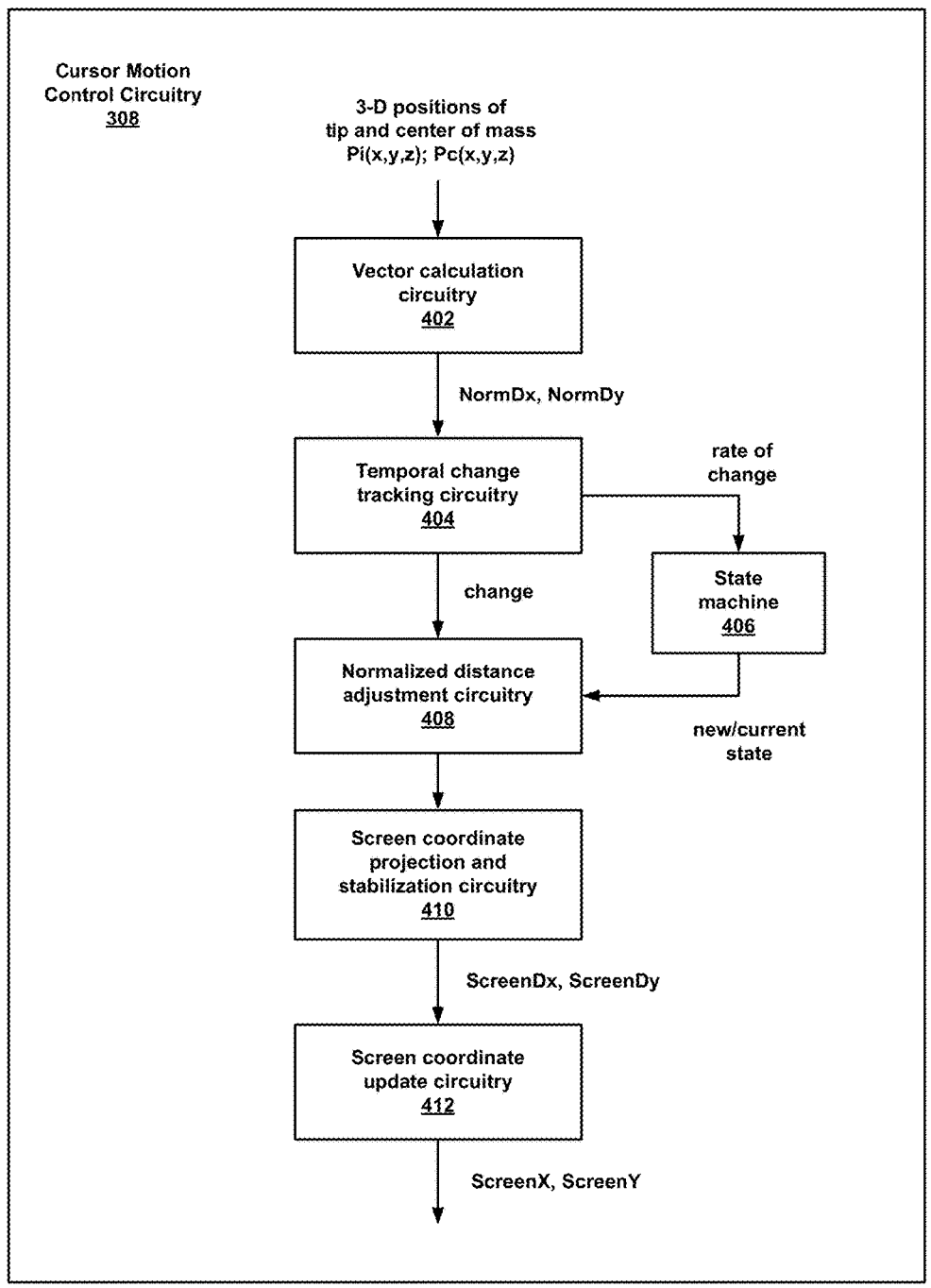
FIG. 4 illustrates a block diagram of one example embodiment consistent with the present disclosure.

FIG. 4 illustrates a block diagram 400 of one example embodiment consistent with the present disclosure. The cursor motion control circuitry 308 is shown to include vector calculation circuitry 402, temporal change tracking circuitry 404, state machine 406, normalized distance adjustment circuitry 408, screen coordinate projection and stabilization circuitry 410 and screen coordinate update circuitry 412.

The vector calculation circuitry 402 may be configured to receive the 3-D positions of the index fingertip $Pi(x,y,z)$ and hand center of mass $Pc(x,y,z)$. From these positions a 2-D vector may be calculated which connects Pi and Pc in the x,y plane. This 2-D vector includes components Dx and Dy which represent the distance from $Pc(x)$ to $Pi(x)$ and from $Pc(y)$ to $Pi(y)$ respectively. Dx and Dy may then be normalized (for example, based on calibration data as described below) to a convenient scale or range such as, for example, 0 to 1. In some embodiments, normalized components, NormDx and NormDy, may be calculated as:

$$\text{Norm}Dx = \max(Dx/\text{Max}Dx, 1)$$

$$\text{Norm}Dy = \max(Dy/\text{Max}Dy, 1)$$

where MaxDx and MaxDy represent the maximum expected distances based on calibration of the user or a sampled population of users.

The temporal change tracking circuitry 404 may be configured to track changes (and rate of change) in NormDx and NormDy over time, for example between current values and one or more previous values. The rate of change may be characterized or classified into one or more categories such as, for example, "high movement speed," "medium movement speed," "slow movement speed" and "no movement." These category names are used to describe relative ranges with respect to one another. Actual values for ranges of movement speed may be selected based on experimentation, heuristics, calibration, user preferences or any other suitable means.

The state machine 406 may be configured to maintain a current user interaction state, as will be described in greater detail in connection with FIG. 5 below. In some embodiments, interaction states may include: idle, free move, coarse pointing, fine pointing and freeze. Here again, the use of terms such as "free," "coarse" and "fine" are meant to indicate conditions of one state relative to another state. The current interaction state may be updated based on the rate of change of NormDx and NormDy. The current interaction state may also be used to weight the pointer position updates.

The normalized distance adjustment circuitry 408 may be configured to modify or adjust the NormDx and NormDy values based on the temporal change and the current user interaction state. For example, if the current user interaction state is "coarse pointing," then NormDx and NormDy may be updated by the temporal change with a scale or weighting factor applied to increase the magnitude of the update. Similarly, if the current user interaction state is "fine pointing," then NormDx and NormDy may be updated by the temporal change with a scale or weighting factor applied to decrease the magnitude of the update. If in the "freeze" state, however, NormDx and NormDy may be held constant regardless of temporal change. Of course the current temporal change may cause the future interaction state to shift from the freeze state to one of the other states depending on the rate of change, thus preventing the pointer from becoming bound to a frozen state.

The screen coordinate projection and stabilization circuitry 410 may be configured to convert or project the adjusted NormDx and NormDy values to screen coordinates which may be based, for example, on the resolution of the screen. This may be calculated as:

screenDx=screenXRes*NormDx screenDy=screenYRes*NormDy

Additionally, stabilization may be performed on the screenDx and screenDy values to reduce unwanted movement of the pointer or cursor position being controlled, which may, for example, create a smoother flow or appearance. Stabilization may be achieved through any type of temporal low pass filter, including an averaging filter or median filter. The degree of filtering, or cut off frequency, may be determined, at least in part, by the current user interaction state. For example, in the more coarse pointing states, stabilization may be reduced (e.g., implementing a higher cut off frequency), while in the more fine pointing states, stabilization may be increased (e.g., implementing a lower cut off frequency).

Figure 5:
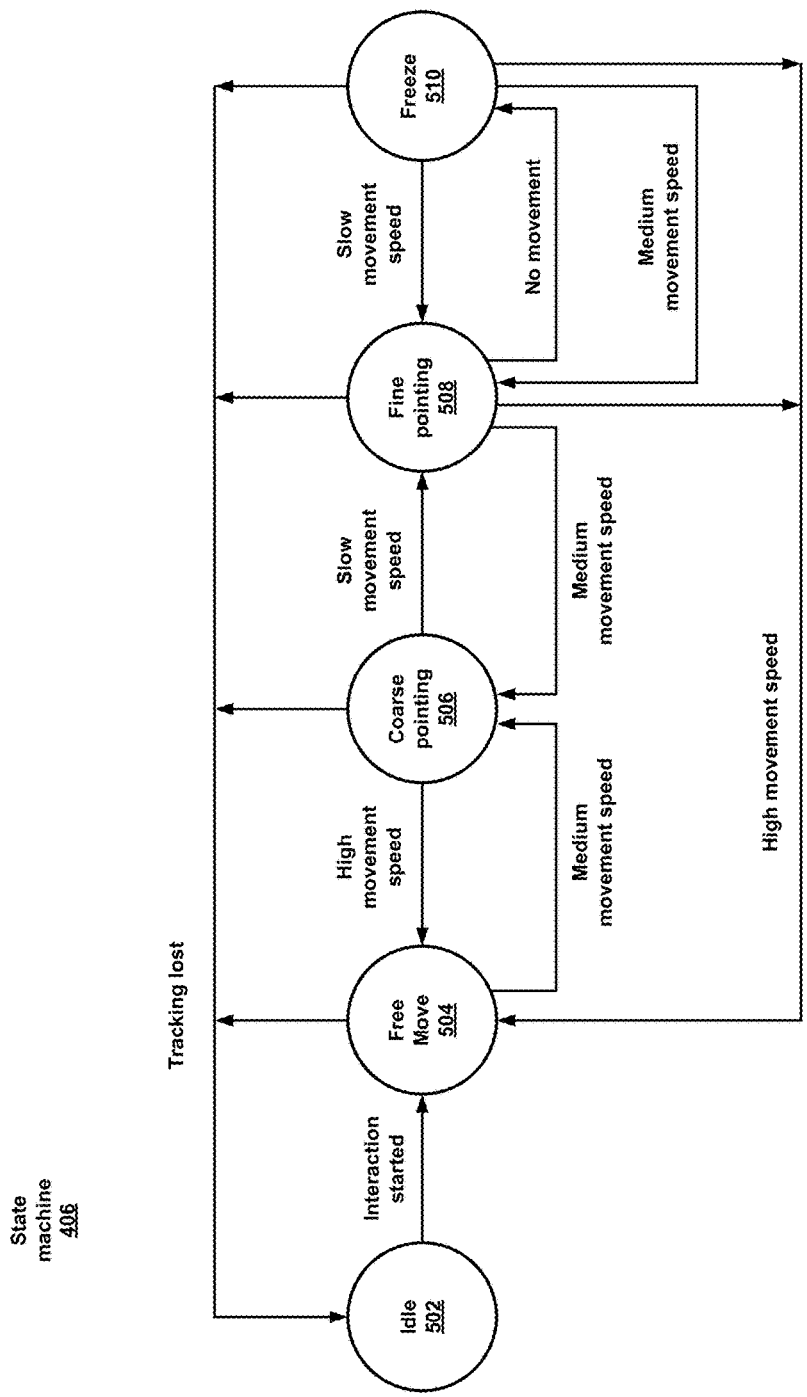
FIG. 5 illustrates a state machine diagram of one example embodiment consistent with the present disclosure.

The screen coordinate update circuitry 412 may be configured to update the coordinates of the screen cursor or other pointing position by the stabilized screenDx and screenDy values:

new screenX=old screenX+stabilized screenDx new screenY=old screenY+stabilized screenDY FIG. 5 illustrates a diagram of state machine 406, of one example embodiment consistent with the present disclosure, in more detail. In this example, the pointing control system 310 may be in one of five states: idle state 502, free move state 504, course pointing state 506, fine pointing state 508, and freeze state 510. In the idle (or no interaction) state 502, the user is not present or not willing to interact with the system. In this state, the system waits for an interaction to start, for example by detecting proximity of the user or by detecting a gesture from the user. When an interaction is started, the state machine transitions to the free move state 504.

In the free move state 504, the user is moving his or her hand freely with relatively fast movements that result in relatively large movements of the cursor that can reach any point on the screen. In other words, the interaction area is the entire screen. Also in this state, the stabilization filtering will be set to a relatively minimal value. From this state, if the user's hand movement is determined to slow down to a relatively medium speed, the state machine transitions to the coarse pointing state 506.

In the coarse pointing state 506, the user is moving his or her hand relatively more slowly than in the free move state 504 and the interaction area of the screen is reduced relative to that of the free move state 504. Also in this state, the stabilization filtering will be set to a relatively medium value. From this state, if the user's hand movement is determined to slow down to a relatively slow speed, the state machine transitions to the fine pointing state 508. Alternatively, if the user's hand movement is determined to increase to a relatively higher speed, the state machine transitions back to the free move state 504.

In the fine pointing state 508, the user is moving his or her hand relatively more slowly than in the coarse move state 506 and the interaction area of the screen is further reduced relative to that of the coarse pointing state 506. In this state the user may be selecting an object on the screen. Also in this state, the stabilization filtering will be set to a relatively maximal value. From this state, if the user's hand movement is determined to slow down further to the point of substantially no movement, the state machine transitions to the freeze state 510. Alternatively, if the user's hand movement is determined to increase to a relatively higher speed, the state machine transitions back to the coarse pointing state 506 or the free move state 504 depending on the increase in movement speed.

In the freeze state 510, the user is moving his or her hand relatively more slowly than in the fine pointing state 508. For example, the hand may be still or movement is non-detectable. In this state there is correspondingly no motion of the screen cursor. From this state, if the user's hand movement is determined to increase to a relatively higher speed, the state machine transitions back to the fine pointing state 508 or the free move state 504 depending on the increase in movement speed.

If tracking of the hand is lost at any point during the operation, for example if the user disengages from the system, the state machine transitions back to the idle state 502 from any other state.

It will be appreciated that in other embodiments, different numbers of states may be employed and associated with different levels of movement control, and that any number or variety of transitions between states is possible, based on different movement speeds or based on any other suitable gestures or indications from the user that may be detectable.

Figure 6:
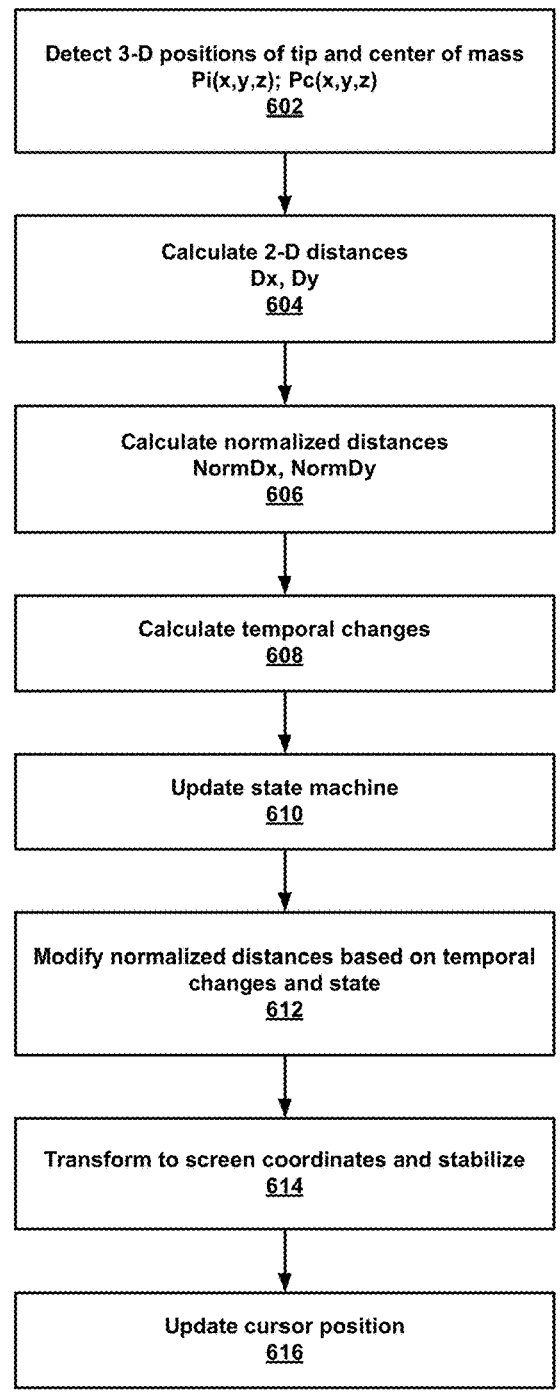
FIG. 6 illustrates a flowchart of operations of one example embodiment consistent with the present disclosure.

FIG. 6 illustrates a flowchart of operations 600 of one example embodiment consistent with the present disclosure. The operations provide a method for state machine based pointing control. At operation 602, the 3-D positions of the tip of the user's finger, Pi(x,y,z), and the center of mass, Pc(x,y,z), of the user's hand are detected, for example by a 3-D visual tracking device. At operation 604, 2-D distances in the x,y plane, Dx and Dy, are calculated between Pi and Pc. At operation 606, the normalized distances, NormDx and NormDy, are calculated based on Dx and Dy and a selected range scale, for example 0 to 1. At operation 608, temporal changes in Dx ad Dy are calculated along with the rates of change of these values. At operation 610, the state machine is updated to reflect a new user interaction state based on the calculated rates of change of Dx and Dy. At operation 612, the normalized distances are modified based on the temporal changes with the application of a weighting or scale factor determined by the current interaction state. At operation 614, the normalized distances are transformed to screen coordinate distances based on screen resolution. Additionally, stabilization filtering may be performed to smooth the screen cursor motion. At operation 616, the cursor position is updated based on the stabilized screen coordinate distances.

Figure 7:
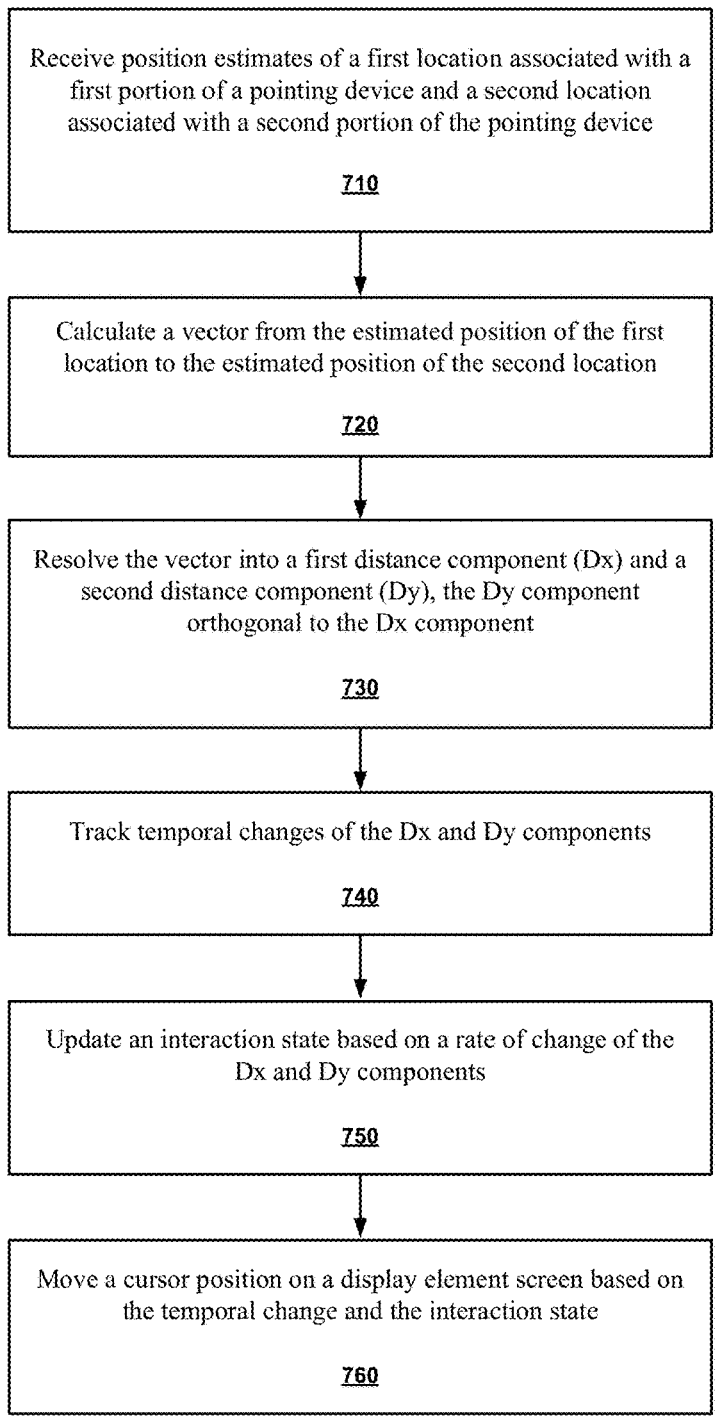
FIG. 7 illustrates a flowchart of operations of another example embodiment consistent with the present disclosure.

FIG. 7 illustrates a flowchart of operations 700 of another example embodiment consistent with the present disclosure. The operations provide a method for state machine based pointing control. At operation 710, a position estimate of a first location associated with a first portion of a pointing device and a position estimate of a second location associated with a second portion of the pointing device are received. At operation 720, a vector from the estimated position of the first location to the estimated position of the second location is calculated. At operation 730, the vector is resolved into a first distance component (Dx) and a second distance component (Dy). The Dy component is orthogonal to the Dx component. At operation 740, temporal change of the Dx and Dy components is tracked. At operation 750, an interaction state is updated based on a rate of change of the Dx and Dy components. At operation 760, a cursor position on a display element screen is moved based on the temporal change and the interaction state.

Figure 8:
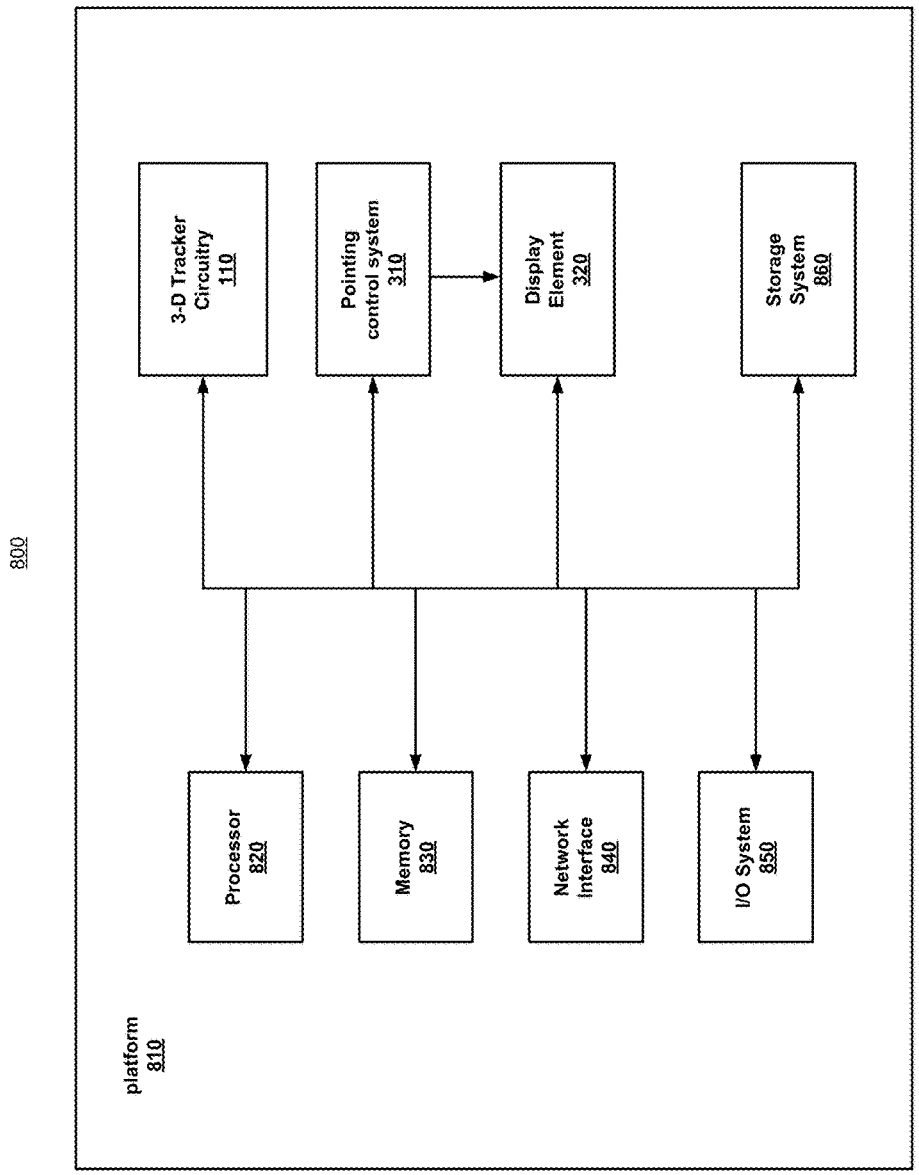
FIG. 8 illustrates a system diagram of a platform of another example embodiment consistent with the present disclosure.

FIG. 8 illustrates a system diagram 800 of one example embodiment consistent with the present disclosure. The system 800 may be a computing platform 810 such as, for example, a workstation, desktop computer or laptop computer. It will be appreciated, however, that embodiments of the system described herein are not limited to computing platforms, and in some embodiments, the system 800 may be a communication, entertainment or any other suitable type of device such as, for example, a smart phone, smart tablet, personal digital assistant (PDA), mobile Internet device (MID), convertible tablet, or notebook. The device may generally present various interfaces to a user via a display element 320 such as, for example, a touch screen, liquid crystal display (LCD) or any other suitable display type.

The system 800 is shown to include a processor 820 and memory 830. In some embodiments, the processors 820 may be implemented as any number of processors or processor cores. The processor (or core) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. The memory 830 may be coupled to the processors. The memory 830 may be any of a wide variety of memories (including various layers of memory hierarchy and/or memory caches) as are known or otherwise available to those of skill in the art. It will be appreciated that the processors and memory may be configured to store, host and/or execute one or more user applications or other software. These applications may include, but not be limited to, for example, any type of computation, communication, data management, data storage and/or user interface task. In some embodiments, these applications may employ or interact with any other components of the platform 810.

System 800 is also shown to include network interface circuitry 840 which may include wired or wireless communication capabilities, such as, for example, Ethernet, cellular communications, Wireless Fidelity (WiFi), Bluetooth®, and/or Near Field Communication (NFC). The network communications may conform to or otherwise be compatible with any existing or yet to be developed communication standards including past, current and future version of Ethernet, Bluetooth®, Wi-Fi and mobile phone communication standards.

System 800 is also shown to include an input/output (IO) system or controller 850 which may be configured to enable or manage data communication between processor 820 and other elements of system 800 or other elements (not shown) external to system 800. System 800 is also shown to include a storage system 860, which may be configured, for example, as one or more hard disk drives (HDDs) or solid state drives (SSDs).

System 800 is also shown to include 3-D tracker circuitry 302 and pointing control system 310 configured to provide state machine based tracking for screen pointing control, as described previously.

It will be appreciated that in some embodiments, the various components of the system 800 may be combined in a system-on-a-chip (SoC) architecture. In some embodiments, the components may be hardware components, firmware components, software components or any suitable combination of hardware, firmware or software.

"Circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Any of the operations described herein may be implemented in one or more storage devices having stored thereon, individually or in combination, instructions that when executed by one or more processors perform one or more operations. Also, it is intended that the operations described herein may be performed individually or in any sub-combination. Thus, not all of the operations (for example, of any of the flow charts) need to be performed, and the present disclosure expressly intends that all sub-combinations of such operations are enabled as would be understood by one of ordinary skill in the art. Also, it is intended that operations described herein may be distributed across a plurality of physical devices, such as processing structures at more than one different physical location. The storage devices may include any type of tangible device, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions.

Thus, the present disclosure provides systems, devices, methods and computer readable media for state machine based pointing control. The following examples pertain to further embodiments.

According to Example 1 there is provided a system for pointing control. The system may include vector calculation circuitry to: receive a position estimate of a first location associated with a first portion of a pointing device and a position estimate of a second location associated with a second portion of the pointing device; calculate a vector from the estimated position of the first location to the estimated position of the second location; and resolve the vector into a first distance component (Dx) and a second distance component (Dy), the Dy component orthogonal to the Dx component. The system may also include tracking circuitry to track temporal change of the Dx and Dy components and to calculate a rate of change of the Dx and Dy components. The system may further include state machine circuitry to maintain and update an interaction state based on the rate of change of the Dx and Dy components; and screen coordinate update circuitry to move a cursor position on a display element screen to a new screen coordinate based on the temporal change and the interaction state.

Example 2 may include the subject matter of Example 1, and the pointing device is a hand and the first location is associated with the center of mass of the palm of the hand and the second location is associated with the tip of the index finger of the hand.

Example 3 may include the subject matter of Examples 1 and 2, and the interaction state includes a coarse pointing state, a fine pointing state and a freeze pointing state, and cursor position movement associated with the coarse pointing state is greater than cursor position movement associated with the fine pointing state, and cursor position movement is disabled in association with the freeze pointing state.

Example 4 may include the subject matter of Examples 1-3, further including a 3-dimensional (3-D) visual tracking system to provide the estimated position of the first location and the estimated position of the second location.

Example 5 may include the subject matter of Examples 1-4, and the Dx component and the Dy component lie in a 2-dimensional (2-D) plane parallel to the screen.

Example 6 may include the subject matter of Examples 1-5, further including calibration circuitry to determine a maximum value of the Dx and Dy components based on physical size of the pointing device; and to normalize the Dx and Dy components based on the maximum value.

Example 7 may include the subject matter of Examples 1-6, further including screen coordinate projection circuitry to scale the normalized Dx and Dy components based on resolution of the display element screen, and the new screen coordinate is further based on the scaled Dx and Dy components.

Example 8 may include the subject matter of Examples 1-7, further including stabilization circuitry to perform temporal low pass filtering of the cursor position movement, based on the interaction state.

Example 9 may include the subject matter of Examples 1-8, further including user initiation detection circuitry to detect user initiation of the pointing control system based on detection of proximity of the user to the display element screen crossing a threshold distance, or based on detection of a gesture of the user.

According to Example 10 there is provided a method for pointing control. The method may include: receiving a position estimate of a first location associated with a first portion of a pointing device and a position estimate of a second location associated with a second portion of the pointing device; calculating a vector from the estimated position of the first location to the estimated position of the second location; resolving the vector into a first distance component (Dx) and a second distance component (Dy), the Dy component orthogonal to the Dx component; tracking temporal change of the Dx and Dy components; updating an interaction state based on a rate of change of the Dx and Dy components; and moving a cursor position on a display element screen based on the temporal change and the interaction state.

Example 11 may include the subject matter of Example 10, and the pointing device is a hand and the first location is associated with the center of mass of the palm of the hand and the second location is associated with the tip of the index finger of the hand.

Example 12 may include the subject matter of Examples 10 and 11, and the interaction state includes a coarse pointing state, a fine pointing state and a freeze pointing state, and cursor position movement associated with the coarse pointing state is greater than cursor position movement associated with the fine pointing state, and cursor position movement is disabled in association with the freeze pointing state.

Example 13 may include the subject matter of Examples 10-12, further including receiving the position estimates from a 3-dimensional (3-D) visual tracking system.

Example 14 may include the subject matter of Examples 10-13, and the Dx component and the Dy component lie in a 2-dimensional (2-D) plane parallel to the screen.

Example 15 may include the subject matter of Examples 10-14, further including performing a calibration to determine a maximum value of the Dx and Dy components based on physical size of the pointing device; and normalizing the Dx and Dy components based on the maximum value.

Example 16 may include the subject matter of Examples 10-15, further including temporal low pass filtering of the cursor position movement, based on the interaction state.

Example 17 may include the subject matter of Examples 10-16, further including detecting user initiation of the pointing control based on detection of proximity of the user to the display element screen crossing a threshold distance, or based on detection of a gesture of the user.

According to Example 18 there is provided at least one computer-readable storage medium having instructions stored thereon which when executed by a processor result in the following operations for pointing control. The operations may include: receiving a position estimate of a first location associated with a first portion of a pointing device and a position estimate of a second location associated with a second portion of the pointing device; calculating a vector from the estimated position of the first location to the estimated position of the second location; resolving the vector into a first distance component (Dx) and a second distance component (Dy), the Dy component orthogonal to the Dx component; tracking temporal change of the Dx and Dy components; updating an interaction state based on a rate of change of the Dx and Dy components; and moving a cursor position on a display element screen based on the temporal change and the interaction state.

Example 19 may include the subject matter of Example 18, and the pointing device is a hand and the first location is associated with the center of mass of the palm of the hand and the second location is associated with the tip of the index finger of the hand.

Example 20 may include the subject matter of Examples 18 and 19, and the interaction state includes a coarse pointing state, a fine pointing state and a freeze pointing state, and cursor position movement associated with the coarse pointing state is greater than cursor position movement associated with the fine pointing state, and cursor position movement is disabled in association with the freeze pointing state.

Example 21 may include the subject matter of Examples 18-20, further including receiving the position estimates from a 3-dimensional (3-D) visual tracking system.

Example 22 may include the subject matter of Examples 18-21, and the Dx component and the Dy component lie in a 2-dimensional (2-D) plane parallel to the screen.

Example 23 may include the subject matter of Examples 18-22, further including performing a calibration to determine a maximum value of the Dx and Dy components based on physical size of the pointing device; and normalizing the Dx and Dy components based on the maximum value.

Example 24 may include the subject matter of Examples 18-23, further including temporal low pass filtering of the cursor position movement, based on the interaction state.

Example 25 may include the subject matter of Examples 18-24, further including detecting user initiation of the pointing control based on detection of proximity of the user to the display element screen crossing a threshold distance, or based on detection of a gesture of the user.

According to Example 26 there is provided a system for pointing control. The system may include: means for receiving a position estimate of a first location associated with a first portion of a pointing device and a position estimate of a second location associated with a second portion of the pointing device; means for calculating a vector from the estimated position of the first location to the estimated position of the second location; means for resolving the vector into a first distance component (Dx) and a second distance component (Dy), the Dy component orthogonal to the Dx component; means for tracking temporal change of the Dx and Dy components; means for updating an interaction state based on a rate of change of the Dx and Dy components; and means for moving a cursor position on a display element screen based on the temporal change and the interaction state.

Example 27 may include the subject matter of Example 26, and the pointing device is a hand and the first location is associated with the center of mass of the palm of the hand and the second location is associated with the tip of the index finger of the hand.

Example 28 may include the subject matter of Examples 26 and 27, and the interaction state includes a coarse pointing state, a fine pointing state and a freeze pointing state, and cursor position movement associated with the coarse pointing state is greater than cursor position movement associated with the fine pointing state, and cursor position movement is disabled in association with the freeze pointing state.

Example 29 may include the subject matter of Examples 26-28, further including means for receiving the position estimates from a 3-dimensional (3-D) visual tracking system.

Example 30 may include the subject matter of Examples 26-29, and the Dx component and the Dy component lie in a 2-dimensional (2-D) plane parallel to the screen.

Example 31 may include the subject matter of Examples 26-30, further including means for performing a calibration to determine a maximum value of the Dx and Dy components based on physical size of the pointing device; and means for normalizing the Dx and Dy components based on the maximum value.

Example 32 may include the subject matter of Examples 26-31, further including means for temporal low pass filtering of the cursor position movement, based on the interaction state.

Example 33 may include the subject matter of Examples 26-32, further including means for detecting user initiation of the pointing control based on detection of proximity of the user to the display element screen crossing a threshold distance, or based on detection of a gesture of the user.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for pointing control, said system comprising:
    vector calculation circuitry to:
        receive a position estimate of a first location associated with a first portion of a pointing device and a position estimate of a second location associated with a second portion of said pointing device;
        calculate a vector from said estimated position of said first location to said estimated position of said second location; and
        resolve said vector into a first distance component (Dx) and a second distance component (Dy), said Dy component orthogonal to said Dx component, wherein said first distance component (Dx) and said second distance component (Dy) represent a distance between the first and second locations in an x plane and a y plane, respectively, and a length of said vector in said x and y plane, wherein the pointing device is configured such that the length of said vector can change in response to movement of said pointing device;
    tracking circuitry to track temporal change of said Dx and Dy components and to calculate a rate of change of said Dx and Dy components;
    state machine circuitry to maintain and update an interaction state based on said rate of change of said Dx and Dy components; and
    screen coordinate update circuitry to move a cursor position on a display element screen to a new screen coordinate based on said temporal change and said interaction state;
    wherein:
        said interaction state comprises a coarse pointing state, a fine pointing state and a freeze pointing state;
        cursor position movement associated with said coarse pointing state is greater than cursor position movement associated with said fine pointing state; and
        cursor position movement is disabled in association with said freeze pointing state; and
        the system further comprises stabilization circuitry to perform different degrees of temporal low pass filtering of said cursor position movement based on whether said interaction state is said coarse pointing state, said fine pointing state, or said freeze pointing state.

2. The system of claim 1, wherein said pointing device is a hand and said first location is associated with the center of mass of the palm of said hand and said second location is associated with the tip of the index finger of said hand.

3. The system of claim 1, further comprising a 3-dimensional (3-D) visual tracking system to provide said estimated position of said first location and said estimated position of said second location.

4. The system of claim 1, wherein movement of said pointing device causes said first location to move relative to said second location, thereby causing a change in the length of said vector.

5. The system of claim 1, further comprising calibration circuitry to determine a maximum value of said Dx and Dy components based on the length of said pointing device; and to normalize said Dx and Dy components based on said maximum value.

6. The system of claim 5, further comprising screen coordinate projection circuitry to scale said normalized Dx and Dy components based on resolution of said display element screen, wherein said new screen coordinate is further based on said scaled Dx and Dy components.

7. The system of claim 1, further comprising user initiation detection circuitry to detect user initiation of said pointing control system based on detection of proximity of said user to said display element screen crossing a threshold distance, or based on detection of a gesture of said user.

8. A method for pointing control, said method comprising:
receiving a position estimate of a first location associated with a first portion of a pointing device and a position estimate of a second location associated with a second portion of said pointing device;
calculating a vector from said estimated position of said first location to said estimated position of said second location;
resolving said vector into a first distance component (Dx) and a second distance component (Dy), said Dy component orthogonal to said Dx component, wherein said first distance component (Dx) and said second distance component (Dy) represent a distance between the first and second locations in an x plane and a y plane, respectively, and a length of said vector in said x and y plane, wherein the length of said vector can change in response to movement of said pointing device;
tracking temporal change of said Dx and Dy components;
updating an interaction state based on a rate of change of said Dx and Dy components; and
moving a cursor position on a display element screen based on said temporal change and said interaction state,
wherein:
said interaction state comprises a coarse pointing state, a fine pointing state and a freeze pointing state;
cursor position movement associated with said coarse pointing state is greater than cursor position movement associated with said fine pointing state; and
cursor position movement is disabled in association with said freeze pointing state; and
the method further comprises performing different degrees of temporal low pass filtering of said cursor position movement based on whether said interaction state is said coarse pointing state, said fine pointing state, or said freeze pointing state.

9. The method of claim 8, wherein said pointing device is a hand and said first location is associated with the center of mass of the palm of said hand and said second location is associated with the tip of the index finger of said hand.

10. The method of claim 8, further comprising receiving said position estimates from a 3-dimensional (3-D) visual tracking system.

11. The method of claim 8, wherein movement of said pointing device causes said first location to move relative to said second location, thereby causing a change in the length of said vector.

12. The method of claim 8, further comprising performing a calibration to determine a maximum value of said Dx and Dy components based on the length of said pointing device; and normalizing said Dx and Dy components based on said maximum value.

13. The method of claim 8, further comprising detecting user initiation of said pointing control based on detection of proximity of said user to said display element screen crossing a threshold distance, or based on detection of a gesture of said user.

14. A non-transitory computer-readable storage medium having instructions stored thereon which when executed by a processor result in the following operations for pointing control, said operations comprising:
receiving a position estimate of a first location associated with a first portion of a pointing device and a position estimate of a second location associated with a second portion of said pointing device;
calculating a vector from said estimated position of said first location to said estimated position of said second location;
resolving said vector into a first distance component (Dx) and a second distance component (Dy), said Dy component orthogonal to said Dx component, wherein said first distance component (Dx) and said second distance component (Dy) represent a distance between the first and second locations in an x plane and a y plane, respectively, and a length of said vector in said x and y plane, wherein the length of said vector can change in response to movement of said pointing device;
tracking temporal change of said Dx and Dy components;
updating an interaction state based on a rate of change of said Dx and Dy components; and
moving a cursor position on a display element screen based on said temporal change and said interaction state;
wherein:
said interaction state comprises a coarse pointing state, a fine pointing state and a freeze pointing state;
cursor position movement associated with said coarse pointing state is greater than cursor position movement associated with said fine pointing state; and
cursor position movement is disabled in association with said freeze pointing state; and
said instructions when executed by said processor further result in performance of the following operations comprising: performing different degrees of temporal low pass filtering of said cursor position movement based on whether said interaction state is said coarse pointing state, said fine pointing state, or said freeze pointing state.

15. The non-transitory computer-readable storage medium of claim 14, wherein said pointing device is a hand and said first location is associated with the center of mass of the palm of said hand and said second location is associated with the tip of the index finger of said hand.

16. The non-transitory computer-readable storage medium of claim 14, further comprising receiving said position estimates from a 3-dimensional (3-D) visual tracking system.

17. The non-transitory computer-readable storage medium of claim 14, wherein movement of said pointing device causes said first location to move relative to said second location, thereby causing a change in the length of said vector.

18. The non-transitory computer-readable storage medium of claim 14, further comprising performing a calibration to determine a maximum value of said Dx and Dy components based on the length of said pointing device; and normalizing said Dx and Dy components based on said maximum value.

19. The non-transitory computer-readable storage medium of claim 14, further comprising detecting user initiation of said pointing control based on detection of proximity of said user to said display element screen crossing a threshold distance, or based on detection of a gesture of said user.

* * * * *